United States Patent

Weigert

[11] Patent Number: 5,142,818
[45] Date of Patent: Sep. 1, 1992

[54] PLANT FEEDING AND SHIELD APPARATUS

[76] Inventor: Charles J. Weigert, P.O. Box 617, Hazelwood, N.C. 28738

[21] Appl. No.: 723,855

[22] Filed: Jul. 1, 1991

[51] Int. Cl.⁵ .................. A01G 13/10; A01G 29/00
[52] U.S. Cl. .......................... 47/25; 47/32; 47/33; 47/48.5
[58] Field of Search .............. 47/32, 33, 48.5, 25

[56] References Cited

U.S. PATENT DOCUMENTS

| | | | |
|---|---|---|---|
| 1,554,865 | 9/1925 | Magoon | 47/48.5 |
| 2,782,561 | 2/1957 | Smith | 47/33 |
| 2,909,328 | 10/1959 | Babyak | 47/33 |
| 3,005,287 | 10/1961 | Dudley | 47/32 |
| 4,268,992 | 5/1981 | Scharf, Sr. | 47/48.5 |
| 4,268,992 | 5/1981 | Scharf, Sr. | 47/32 |
| 4,336,666 | 6/1982 | Caso | 47/48.5 |
| 4,866,880 | 9/1989 | Weinblatt | 47/48.5 |

FOREIGN PATENT DOCUMENTS

| | | | |
|---|---|---|---|
| 261513 | 10/1961 | Australia | 47/33 |
| 610406 | 10/1960 | Italy | 47/33 |
| 110004 | 3/1964 | Netherlands | 47/33 |

Primary Examiner—David A. Scherbel
Assistant Examiner—Joanne C. Downs
Attorney, Agent, or Firm—Leon Gilden

[57] ABSTRACT

A torroidal outer ring is positioned with a plant coaxially thereof, wherein the torroidal outer ring includes ring segments securable relative to one another in an end-to-end relationship receiving spikes between ring segment junctions to secure the rings together and to an underlying ground surface. A cylindrical trough is directed about a top wall of the ring member, including apertures to direct fluid therethrough. A central insert is positioned medially to the top wall, including a fertilizer to be dispersed through each interior cavity of each ring segment to the underlying ground surface.

1 Claim, 5 Drawing Sheets

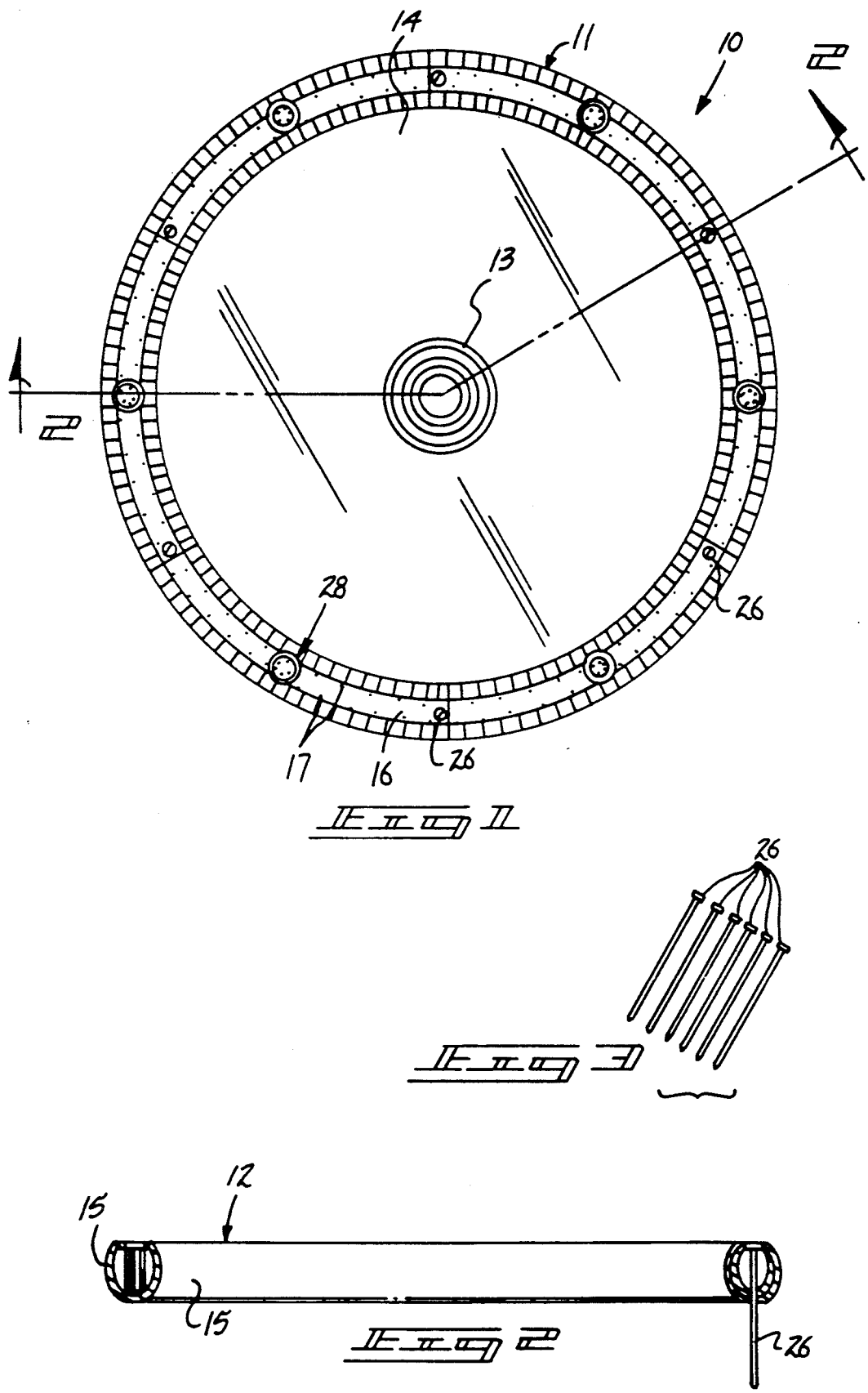

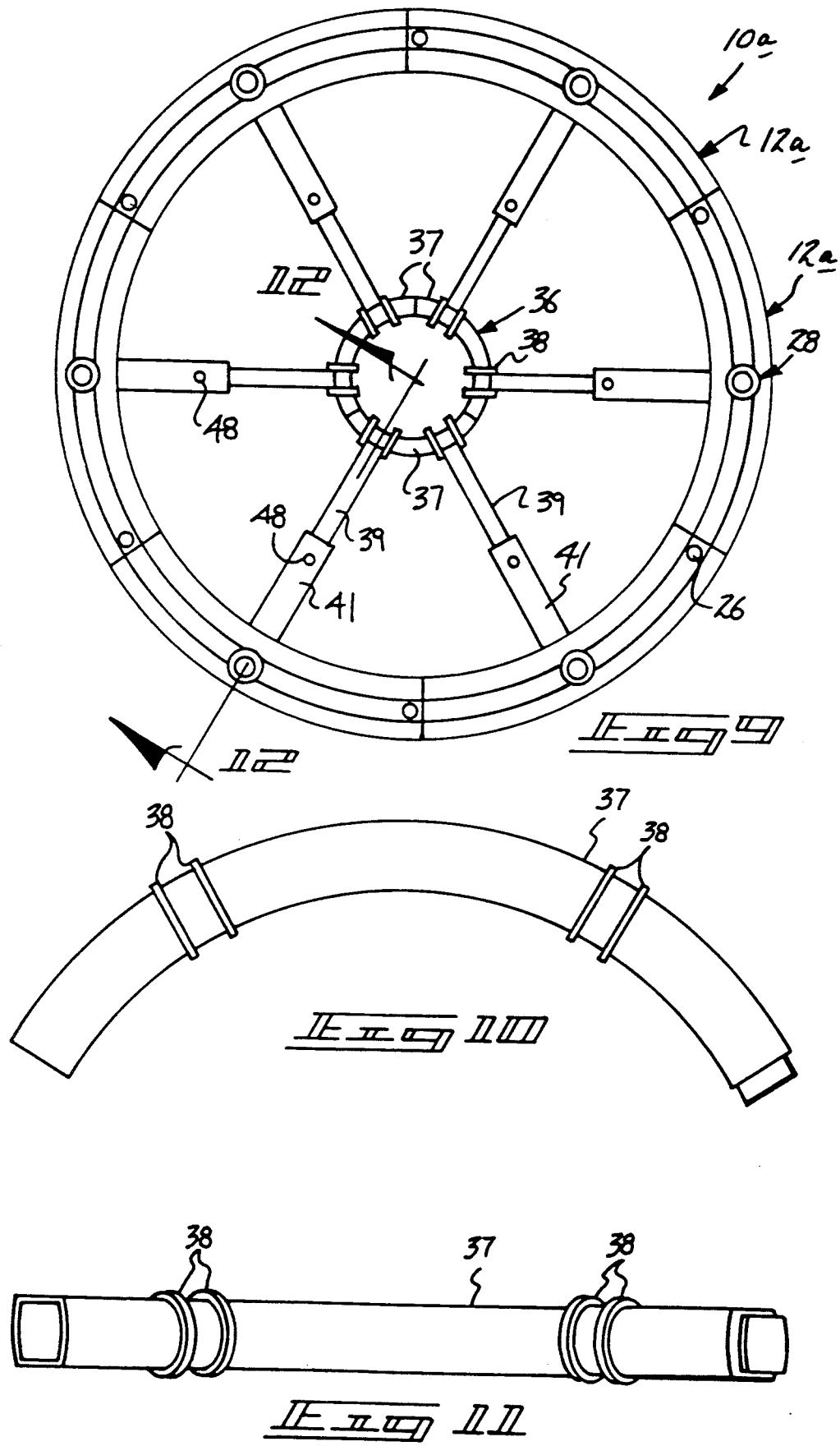

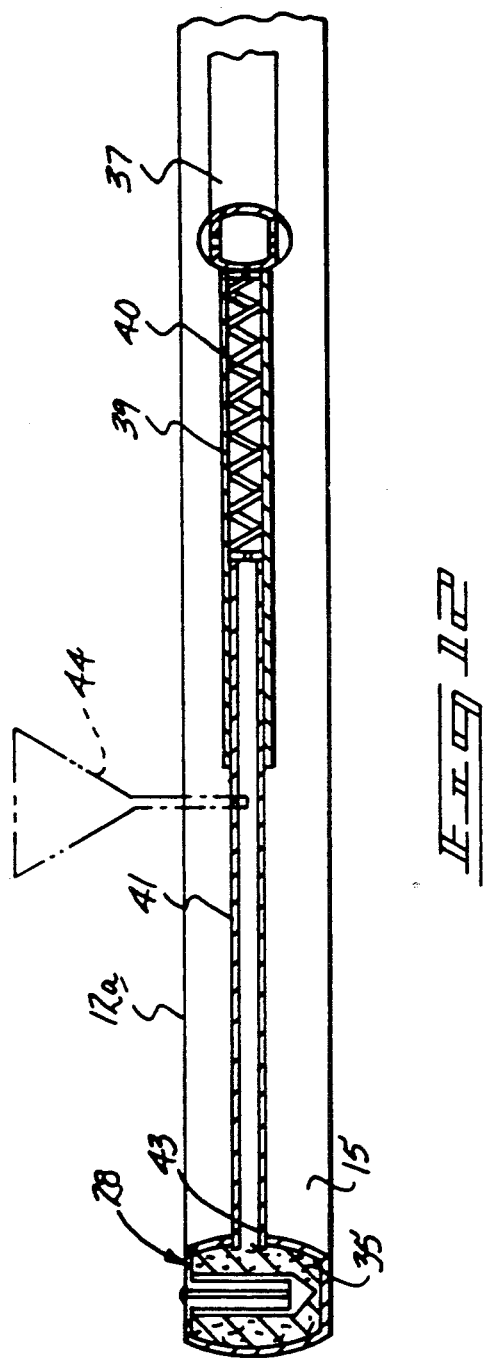

PLANT FEEDING AND SHIELD APPARATUS

BACKGROUND OF THE INVENTION

1. Field of the Invention

The field of invention relates to plant protective devices, and more particularly pertains to a new and improved plant feeding and sheild apparatus wherein the same is directed to afford protection and timed feeding of plant food to a coaxially located plant relative to the structure.

2. Description of the Prior Art

Various prior art devices are utilized throughout the prior art to provide protection relative to plant structure. Such protection is desirable in affording protection to plants relative to various gardening procedures. Further, fertilization and feeding of plants is an essential part of gardening procedure and is directed in the prior art and exemplified in U.S. Pat. No. 4,776,130 to West, et al. wherein a plant fertilizer holder is in the form of a cavity, with a food spike mounted therewithin for timed released feeding of plant food into an adjacent plant.

U.S. Pat. No. 4,700,570 to Allen sets forth a tree bark protector defining a shield formed with a bottom flange and a cylindrical upper surface for positioning about a lowermost portion of a tree trunk.

U.S. Pat. No. 4,845,889 to Taylor sets forth a lawn trimming shield positionable about a plant and tree for protection to the associated plant or tree during a lawn trimming procedure.

U.S. Pat. No. 4,870,781 to Jones set forth a tree support and feeder stake wherein the spike member includes apertures directing plant food from a internal cavity of the spike.

U.S. Pat. No. 4,268,992 to Scharf, Sr. sets forth a tree protector including a central hollow vertical shaft and a flange mounted to a bottom surface of the shaft receiving hollow spikes to direct plant food about the associated tree.

As such, it may be appreciated that there continues to be a need for a new and improved plant feeding and sheild apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of plant feeding and shield apparatus now present in the prior art, the present invention provides a plant feeding and shield apparatus wherein the same provides for a segmented shield structure formed of annular segments to afford protection and formed of memory retentent material to accommodate impact to the outer torroidal ring member defining the apparatus. As such, the general purpose of the present invention, which will be described subsequently in greater detail, is to provide a new and improved plant feeding and shield apparatus which has all the advantages of the prior art plant feeding and shield apparatus and none of the disadvantages.

To attain this, the present invention provides a torroidal outer ring positioned with a plant coaxially thereof, wherein the torroidal outer ring includes ring segments securable relative to one another in an end-to-end relationship receiving spikes between ring segment junctions to secure the rings together and to an underlying ground surface. A cylindrical trough is directed about a top wall of the ring member, including apertures to direct therethrough. A central insert is positioned medially to the top wall, including a fertilizer to be dispersed through each interior cavity of each ring segment to the underlying ground surface.

My invention resides not in any one of these features per se, but rather in the particular combination of all of them herein disclosed and claimed and it is distinguished from the prior art in this particular combination of all its structures for the function specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claim appended hereto. Those skilled in the art will appreciate that the conception, upon which this disclosure is based, may readily be utilized as a basis for the designing of other structures, methods and systems for carrying out the several purpose of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved plant feeding and shield apparatus which has all the advantages of the prior art plant feeding and shield apparatus and none of the disadvantages.

It is another object of the present invention to provide a new and improved plant feedinng and shield apparatus which may be easily and efficiently manufactured and marketed.

It is a further object of the present invention to provide a new and improved feeding and shield apparatus which is of a durable and reliable construction.

An even further object of the present invention is to provide a new and improved plant feeding and sheild apparatus which is susceptible of a low cost of manufacture with regard to both materials and labor, and which accordingly is then susceptible of low prices of sale to the consuming public, thereby making such plant feeding and shield apparatus economically available to the buying public.

Still yet another object of the present invention is to provide a new and improved plant feeding and shield apparatus which provides in the apparatuses and methods of the prior art some of the advantages thereof, while simultaneoulsy overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic top view of the instant invention.

FIG. 2 is an orthographic view, taken along the lines 2—2 of FIG. 1 in the direction indicated by the arrows.

FIG. 3 is an orthographic top view of spike members utilized to secure the ring segments together.

FIG. 9 is an orthographic top view of a modified apparatus utilized by the instant invention.

FIG. 10 is an orthographic top view of an inner ring segment utilized by the instant invention as illustrated in FIG. 9.

FIG. 11 is an orthographic side view of the ring segment, as illustrated in FIG. 10

FIG. 12 is an orthographic view, taken along the lines 12—12 of FIG. 9 in the direction indicated by the arrows.

DESCRIPTION OF THE PREFERRED EMBODIMENT

Figure 4:
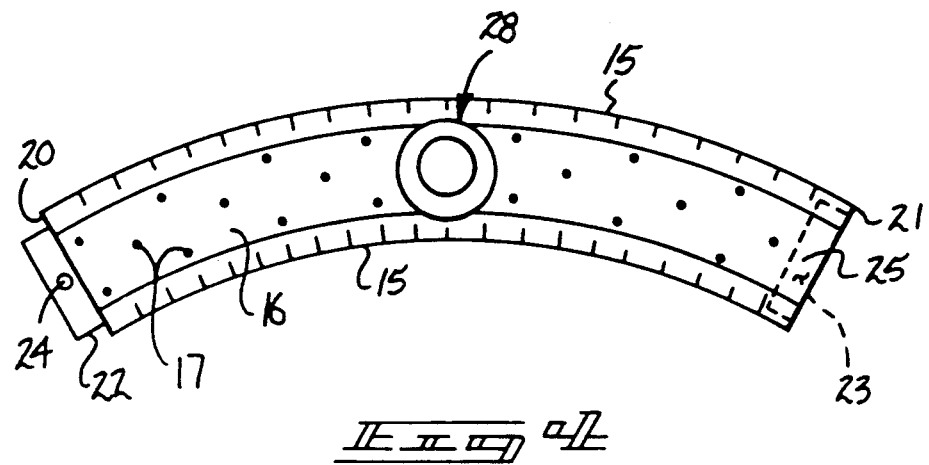
FIG. 4 is a top orthographic view of a ring segment of the ring member of the invention.
Figure 5:
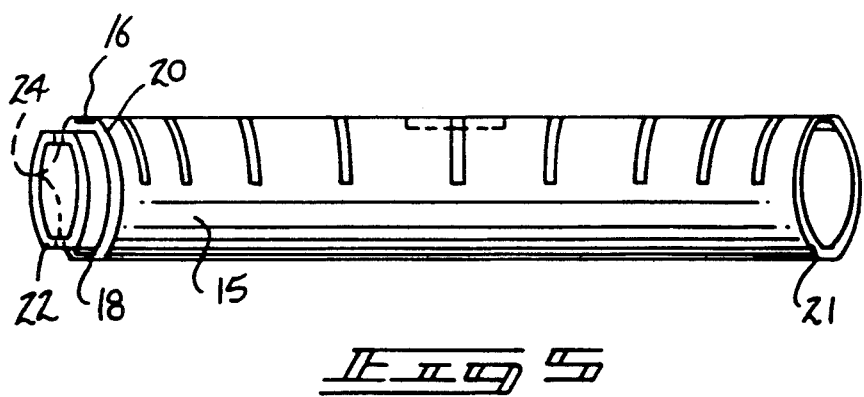
FIG. 5 is an orthographic side view of the ring segment, as illustrated in FIG. 4.
Figure 6:
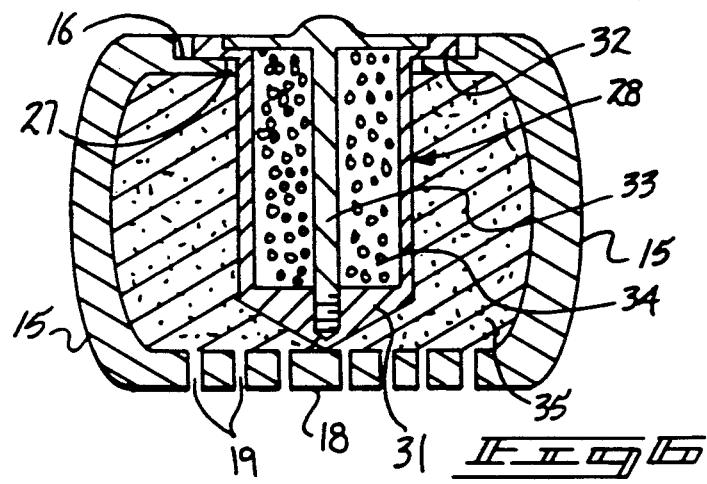
FIG. 6 is an orthographic cross-sectional illustration of a ring segment of the instant invention.
Figure 7:
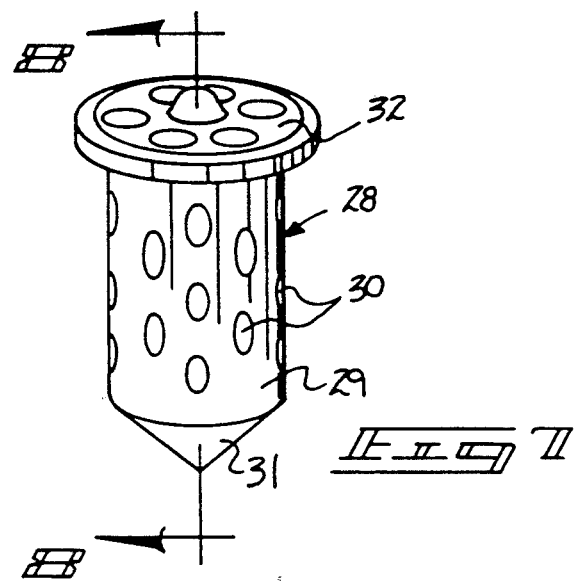
FIG. 7 is an isometric illustration of an insert housing utilized by the instant invention.
Figure 8:
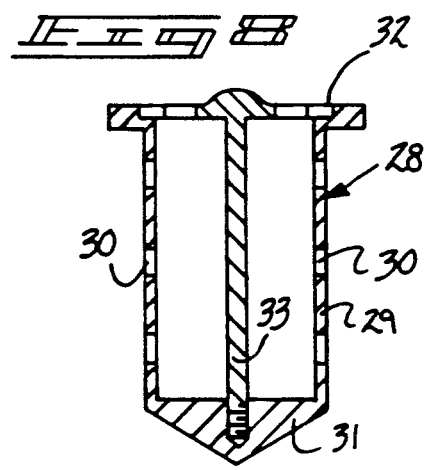
FIG. 8 is an orthographic view, taken along the lines 8—8 of FIG. 7 in the direction indicated by the arrows.

With reference now to the drawings, and in particular to FIGS. 1 to 12 thereof, a new and improved plant feeding and shield apparatus embodying the principles and concepts of the present invention and generally designated by the reference numerals 10 and 10a will be described.

More specifically, the plant feeding and shield apparatus 10 of the instant invention essentially comprises a torroidal ring member 11 defined by a plurality of annular ring segments 12 that are interconnected in an end-to-end relationship to define the ring member 11. A covering web 14 extends interiorly of the ring member 11 about a central plant 13 to be protected, such as a tree and like. Each ring segment 12 includes interior and exterior arcuate side walls 15. The side walls are concentric relative to one another, with each ring segment 12 including a top wall trough 16 defining a cylindrical trough when the ring segments are connected together to define the torroidal ring member 11. Each ring segment 12 further includes a bottom wall 18. The top wall trough 16 includes a matrix of trough apertures directed therethrough directing rain water and the like interiorly of each ring segment 12, the bottom wall 18 including bottom wall apertures 19 to direct rain water to an underlying ground surface.

Each ring segment 12 further includes a ring segment forward end and a ring segment rear end, the ring segment forward end 20 includes a forward end projecting ring 22 projecting forwardly of the ring segment forward end 20 and defined by a cross-sectional configuration less than that defined by the forward end 20. The ring segment rear end 21 includes a rear end socket 23 to complementarily receive a forward end projecting ring 22 of an adjacent ring segment 12 to thereby provide proper alignment of each of the ring segments 20 to form the torroidal ring member 11. The ring segment forward end 20 includes projecting ring aligned bores 24 directed through upper and lower surfaces of each forward end projecting ring 22, with each rear end socket 23 including socket aligned bores 25 directed through upper and lower surfaces of the ring socket directed through the top wall trough 16 and the bottom wall 18. The projecting ring aligned bores 24 and the socket aligned bores 25 are coaxially aligned relative to one another when the ring segments 12 are in a secured relationship, as illustrated in FIG. 1. In this manner, a spike 26 is directed through the bores 24 and 25 to secure the segments together and to secure the ring member 11 thusly constructed to an underlying ground surface. Each top wall trough 16 includes a top wall opening 27 positioned medially thereof to receive an insert housing 28. Each insert housing 28 includes a cylindrical side wall 29, including a matrix of cylindrical side wall openings 30 directed therethrough. An insert housing bottom wall 31 threadedly receives a lid threaded fastener 33 orthogonally and integrally mounted to a bottom surface of the apertured lid 32 to provide an enclosed insert housing when positioned within the cavity of each ring segment 12. Each insert housing 28 is provided with a predetermined quantity of a fertilizer compound 34, whereupon rain water is directed through each insert housing 28 and thereafter directs the fertilizer compound 34 in solution through a porous filler of granular material 35 formed within the cavity of each ring segment 12 and thereafter directs the fertilizer compound solution into an underlying ground surface through the bottom wall apertures 19.

FIGS. 9–12 illustrate a modified apparatus 10a, including an inner torroidal ring 36 positioned concentrically and interiorly spaced from the torroidal ring member 11. The inner torroidal ring 36 includes at least a plurality of ring semi-cylindrical segments 37 that are secured together utilizing a semi-cylindrical segment projection received within an adjacent socket, in a manner depicted by the interconnection of the ring segments 12 together. Each of the ring semi-cylindrical segments 37 includes plural pairs of spaced disks 38 to mount a first tube 39 thereto that includes a spring member 40 to coaxially bias a second tube 41 relative to the first tube 39, wherein the second tube 41 is received within a second tube opening 42 within an inner arcuate side wall 15 of radially aligned ring segment 12. Each second tube 41 includes a second tube opening 48 to receive a funnel 44 to accept additional rain fall to thereby direct the rain water through the funnel 44, through the second tube 41, and into the adjacent ring segment 12 to direct additional rain flow in the ring member 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A plant feeding and shield apparatus, comprising,
   a torroidal ring member, the torroidal ring member including a plurality of ring segments interconnected in an end-to-end relationship, each ring segment including a forward end and a rear end, each ring segment including a forward projecting ring projecting forwardly beyond the forward end, and each rear end including a socket directed interiorly of the rear end, wherein each socket receives an adjacent projecting ring, and
   each ring segment includes a top wall trough, each top wall trough of each ring segment is arranged in an aligned relationship to define an annular trough, and
   each top wall trough includes a matrix of apertures directed therethrough, and
   each ring segment includes a bottom wall, and each bottom wall includes a matrix of apertures directed therethrough, and
   each projecting ring includes a plurality of projecting ring aligned ring bores, and
   each socket includes a plurality of socket aligned bores, wherein the projecting ring aligned bores and the socket aligned bores are coaxially aligned when the ring segments are secured together, and the aligned bores receive a spike therethrough for securement of the ring segments together and securement to an underlying support surface, and
   each top wall trough of each ring segment includes a top wall opening, and an insert housing is selectively positionable within each top wall opening, each insert housing includes a cylindrical side wall, and each cylindrical side wall includes a matrix of side wall openings, and each insert housing includes an apertured lid, the apertured lid in planar alignment with the top wall trough when the insert housing is positioned within the top wall opening, and
   each insert housing includes a housing bottom wall, and each housing bottom wall includes a threaded bore, and each apertured lid includes a lid threaded fastener orthogonally and integrally mounted to a bottom surface of said apertured lid, and the lid threaded fastener is threadedly received within the threaded bore of the bottom wall, and
   each ring segment includes a granular filler material contained within each ring segment coextensively therethrough, and
   an inner torroidal ring coaxially positioned within the torroidal ring member, the inner torroidal ring includes a plurality of inner ring segments, each inner ring segment includes a first tube mounted thereto, the first tube includes a spring member mounted within the first tube, and a second tube slidably mounted to the first tube, wherein the spring member biases the second tube in an extended relationship relative to the first tube, and the second tube includes a second tube forward end, and at least one of said ring segments includes a ring segment side wall opening directed through a side wall of the at least one ring segment to receive the second tube forward end therethrough, and the second tube includes a second tube opening, the second tube opening includes a funnel therewithin, and the second tube in fluid communication with the said at least one ring segment to direct fluid through the funnel, the second tube, and into the at least one said ring segment.

* * * * *